US012141536B1

(12) United States Patent
Khosla et al.

(10) Patent No.: US 12,141,536 B1
(45) Date of Patent: Nov. 12, 2024

(54) CHATBOT UTTERANCE ROUTING IN A PROVIDER NETWORK

(71) Applicant: Amazon Technologies, Inc., Seattle, WA (US)

(72) Inventors: Sopan Khosla, Sunnyvale, CA (US); Rashmi Gangadharaiah, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/122,301

(22) Filed: Mar. 16, 2023

(51) Int. Cl.
*G06F 40/284* (2020.01)
*G06F 40/126* (2020.01)
*G06F 40/35* (2020.01)
*G06N 20/00* (2019.01)
*H04L 51/02* (2022.01)

(52) U.S. Cl.
CPC ............ *G06F 40/35* (2020.01); *G06F 40/126* (2020.01); *G06F 40/284* (2020.01); *G06N 20/00* (2019.01); *H04L 51/02* (2013.01)

(58) Field of Classification Search
CPC ........ G06F 40/284; G06N 20/00; H04L 51/02
See application file for complete search history.

(56) References Cited

U.S. PATENT DOCUMENTS

| | | | |
|---|---|---|---|
| 2014/0101119 A1* | 4/2014 | Li | G06F 16/3331 707/706 |
| 2018/0307745 A1* | 10/2018 | Bachrach | G06N 3/006 |
| 2022/0171947 A1* | 6/2022 | Xu | G06N 3/006 |
| 2023/0394247 A1* | 12/2023 | Li | G06F 40/284 |

OTHER PUBLICATIONS

Khosla, S., et al., "Evaluating the Practical Utility of Confidence-score based Techniques for Unsupervised Open-world Intent Classification", Available online at <https://aclanthology.org/2022.insights-1.3/>, Proceedings of the Third Workshop on Insights from Negative Results in NLP, May 26, 2022, pp. 18-23.

* cited by examiner

*Primary Examiner* — Shirley X Zhang
(74) *Attorney, Agent, or Firm* — Nicholson De Vos Webster & Elliott LLP

(57) ABSTRACT

Techniques for chatbot utterance routing in a provider network include jointly training a service classifier and a plurality of auxiliary classifiers based on a mixed service set of labeled chatbot utterance training examples to yield a trained service classifier. When a particular chatbot user utterance is received, the trained service classifier can be used to determine if the utterance is in-scope or out-of-scope, and if in-scope, to determine which service of a set of services in the provider network to which to route the utterance for further processing. By jointly training the service classifier with the auxiliary classifiers, the accuracy of the in-scope/out-of-scope determination by the trained service classifier is improved as well as its accuracy in routing the utterance to the appropriate service for processing the utterance as intended by the user.

20 Claims, 7 Drawing Sheets

|  | $\gamma_{mut}$ | $\gamma_{inout}$ | $\gamma_{unstruct}$ | $\gamma_{multi}$ | $\gamma_{sevop}$ |
|---|---|---|---|---|---|
| CLI SERVICE | 1 | 1 | 1 | 1 | 1 |
| SEARCH ENGINE SERVICE | 1 | 1 | 1 | 0 | 0 |
| RESOURCE EXPLORER SERVICE | 1 | 1 | 1 | 1 | 0 |
| OUT-OF-SCOPE | 0 | 1 | 0 | 0 | 0 |

*FIG. 4*

CHATBOT UTTERANCE ROUTING IN A PROVIDER NETWORK

BACKGROUND

An interactive computer agent (also called a "chatbot") is useful for customers of a provider network to monitor and interact with their computing, network, and data storage resources provisioned in the provider network. The accuracy of responses with respect to user utterances that are input to the chatbot can affect how well those responses are received. Consider an example where a user utterance that is a command line interface (CLI) command to create a new data storage container with a data storage service of the provider network. The processing of the utterance by the chatbot should include executing the CLI command and returning a response indicating a result of the execution (e.g., successful). The understand of the intent of the utterance by the chatbot can be critically important. For example, if instead of executing the utterance as a CLI command, the chatbot uses the utterance as a search query to query a corpus of text documents indexed by a search engine, then the chatbot may not be carrying out the user's intent of the utterance.

Techniques described herein address these and other issues.

BRIEF DESCRIPTION OF DRAWINGS

Various examples in accordance with the present disclosure will be described with reference to the drawings, in which:

FIG. 4 illustrates an example of masking variables for a masked cross-entropy loss calculation according to some examples.

DETAILED DESCRIPTION

Figure 1:
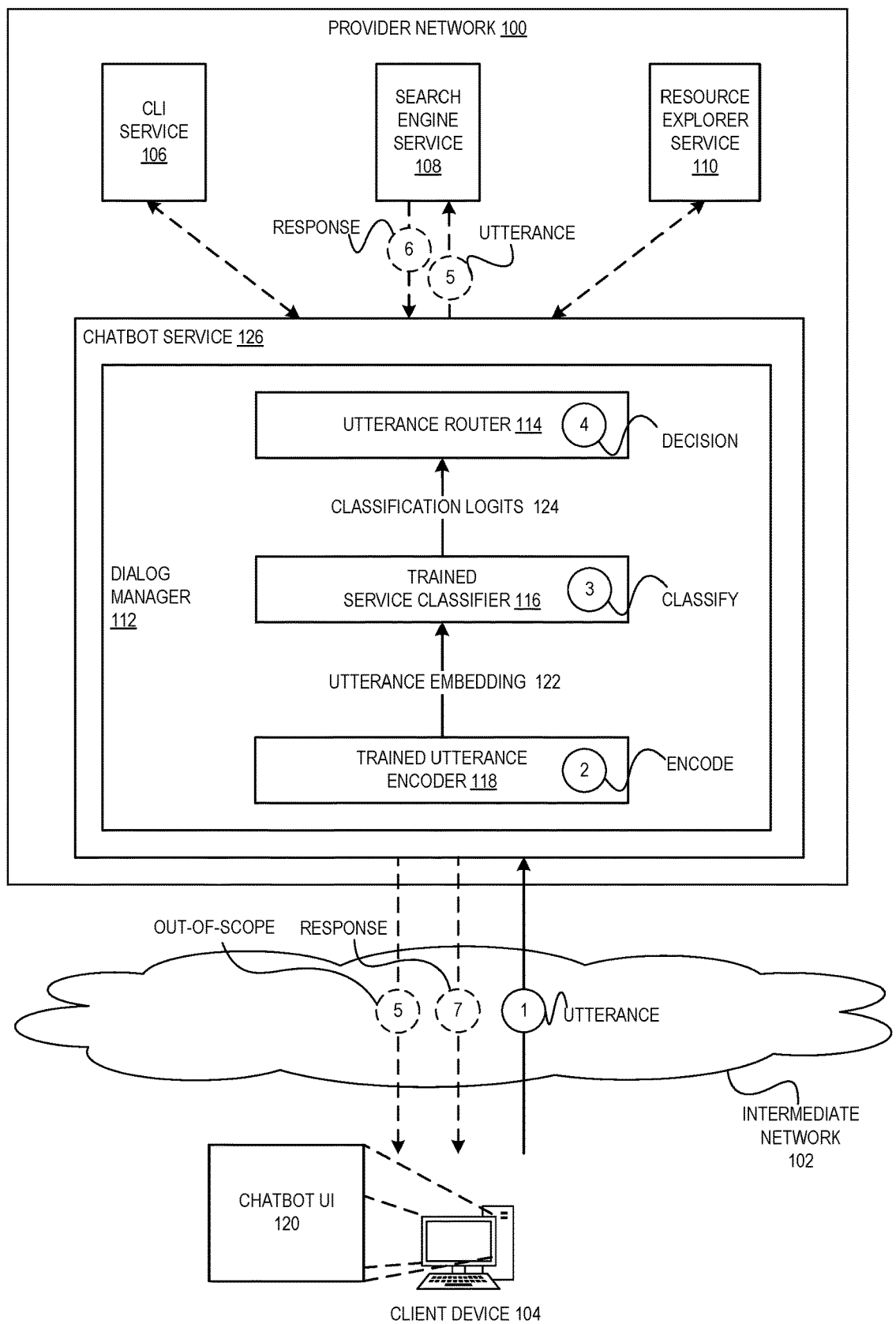
FIG. 1 illustrates an example system and a method for chatbot utterance routing in a provider network.

The present disclosure relates to methods, systems, and non-transitory computer-readable media (collectively "techniques") for chatbot utterance routing in a provider network.

The understanding of the intent of user utterances that are input to a chatbot can be vitally important to determine how to best to process the utterances. Unfortunately, it would hinder the user experience for the chatbot to require the user to explicitly specify the intent of each utterance. So, inference is needed. Along with the need for inference, there is a need for accuracy.

Techniques herein balance the need to infer the intent of a user utterance with the need to accurately infer the correct intent, using a service classifier that is jointly trained with a set of auxiliary classifiers based on a mixed service set of labeled chatbot utterance training examples to yield a trained service classifier. When a particular chatbot user utterance is received, the trained service classifier can be used to determine if the utterance is in-scope or out-of-scope, and if in-scope, to determine which service of a set of services in the provider network to which to route the utterance for further processing. By jointly training the service classifier with the auxiliary classifiers, the accuracy of the in-scope/out-of-scope determination by the trained service classifier is improved as well as its accuracy in routing the utterance to the appropriate service for processing the utterance as intended by the user.

As an example of the problem addressed by the techniques herein, consider deploying, monitoring, and interacting with resources (e.g., virtual machine instances) provisioned to users in a provider network. The provider network may offer various services for accomplishing this. For example, the provider network may offer: (1) a command line interface (CLI) service that allows users to issue CLI commands for execution in the provider network, (2) a search engine service that allows users to search indexed technical documentation using natural language text queries, and (3) a resource explorer service that allows users to query a database of the resources they have deployed in the provider network.

Each of these services may have respective capabilities for using a text input to carry out a requested operation. For example, the CLI service may be capable of executing the text input as a CLI command, the search engine service may be capable of using the text input to identify indexed documentation that matches the criteria of the text input, and the resource explorer service may be capable of converting the text input into a domain-specific database query language statement that it can then execute against a database.

A text input that is intended for one of the services (e.g., the CLI service) but that is instead input to another of the services (e.g., the search engine service) may not produce the expected result. For example, a text input of "list my virtual machine instances deployed in the US West region of the provider network" that is intended for the resource explorer service will not produce the expected result if processed by the CLI service or the search engine service. However, the text input of "in which regions of the provider network can virtual machine instances be deployed?" intended for the search engine service will not produce the expected result if processed by CLI service or the resource explorer service. As another example, the text input of "create a new data storage container in the data storage service" intended for the CLI service will not produce the right result if processed by the search engine service or the resource explorer service. Thus, a chatbot that routes a user utterance to the right service for further processing is very important.

The correct routing of chatbot user utterances is not only important for the provider network operator, whose revenue depends on satisfied users, but also to users who can efficiently accomplish a multitude of different provider network resource provisioning, management, and interaction tasks using a convenient chatbot user interface. If an utterance is incorrectly routed, the user's intent of the utterance may not be carried out and the response the user receives may be incorrect and confusing. The techniques herein provide for accurate routing of chatbot user utterances to the services that are intended to process the utterances.

The techniques herein use a jointly trained service classifier that is trained to classify user utterances as intended for one of a set of services or as out-of-scope. The service classifier is jointly trained with a set of auxiliary classifiers specific to the set of services. The joint training allows the service classifier to classify user utterances more accurately as in-scope or out-of-scope and if in-scope, to more accurately route user utterances to the intended services for processing the utterances.

The techniques proceed in some embodiments by jointly training a service classifier and a set of auxiliary classifiers based on a mixed service set of labeled chatbot utterance training examples to yield a trained service classifier. When a particular chatbot user utterance is received, the trained service classifier is used to determine whether the utterance is in-scope or out-of-scope. If the utterance is determined to be in-scope, then output of the training service classifier is used to determine which service of a set of services that the utterance is intended for. The utterance is then sent to the intended service for further processing.

In some embodiments, the accuracy of the trained service classifier is improved by jointly training the service classifier and the set of auxiliary classifiers according to a masked cross-entropy loss and a contrastive loss.

In some embodiments, the output of the trained service classifier represents a classification of the utterance by the trained service classifier and encompasses a plurality of logits. Each logit is for one service and represents a probability that the utterance is intended for the respective service. The determination of whether the utterance is in-scope or out-of-scope is based on the plurality of logits.

Example System and Method for Chatbot Utterance Routing in a Provider Network

FIG. 1 illustrates a system and a method for chatbot utterance routing in a provider network. In summary, the system encompasses provider network 100, intermediate network 102, and client device 104. Provider network 100 encompasses command line interface (CLI) service 106, search engine service 108, resource explorer service 110, and dialog manager 112. Dialog manager 112 encompasses utterance router 114, trained service classifier 116, and trained utterance encoder 118. Client device 104 also presents chatbot user interface (UI) 120 on a video display screen of or operatively coupled to client device 104. Chatbot UI 120 can encompass a graphical user interface or a command line interface. For example, chatbot UI 120 can be presented by a web browser application or a mobile application executing at client device 104.

The components of provider network 100 including CLI service 106, search engine service 108, resource explorer service 110, and dialog manager 112 are implemented by one or more electronic computing devices having one or more processors for executing code for performing the various operations of the techniques herein.

Steps of the method are depicted by numbered circles that overlay directed arrows. The directed arrows represent a direction of data flow but not necessarily the exclusive direction. The steps of the method can be performed in the order indicated by the numbered circles. However, unless the context clearly indicates otherwise, steps can be performed in different orders, concurrently, or in parallel.

In summary, the method proceeds at step 1 by trained utterance encoder 118 of dialog manager 112 receiving a user utterance that is input by a user of client device 104 using chatbot UI 120. At step 2, the utterance is encoded by trained utterance encoder 118 as utterance embedding 122. At step 3, the utterance embedding 122 is input to trained service classifier 116 which classifies the utterance producing classification logits 124 as output representing the classification. At step 4, utterance router 114 decides if the utterance is in-scope or out-of-scope based on classification logits 124, and if in-scope, utterance router 114 decides which of services 106, 108, and 110 to which to route the utterance based on classification logits 124. At step 5, if the utterance is in-scope, then utterance router 114 sends the utterance to the selected service for further processing. At step 6, dialog manager 112 receives a response from the selected service reflecting the selected service's processing of the utterance. At step 7, the dialog manager 112 returns the received response to client device 104. Alternatively, if, at step 4, utterance router 114 determines that the utterance is out-of-scope, then, at step 5, dialog manager 112 returns a response to client device 104 indicating that the utterance is out-of-scope without sending the utterance to a service for further processing.

Provider network 100 is a cloud computing platform providing infrastructure and application services that allow users to build and deploy scalable, flexible, and cost-effective applications in the cloud. Client device 104 is representative of just one client device of potentially hundreds, thousands, or millions or more users that may use provider network 100 for cloud computing needs.

Provider network 100 may offer a wide range of cloud services including computing, storage, networking, database, analytics, machine learning, security, and Internet of Things (IoT) services. These services can be used by users to build a variety of applications, such as websites, mobile apps, big data processing, and artificial intelligence (AI) applications. The operator of provider network 100 may charge users on a pay-as-you-go pricing model where users pay for the resources in the provider network they use.

The services offered by provider network 100 can include CLI service 106, search engine service 108, and resource explorer service 110.

CLI service 106 provides a command line interface for other services in provider network 100 for executing various commands with the other services.

For example, CLI service 106 may allow a user to restart one or more virtual machine instances provisioned to the user by a hardware virtualization service (not shown) in provider network 100 with a "reboot-instances" command. The hardware virtualization service allows multiple virtual machines (VMs) to run on a single physical server, using software to simulate the underlying hardware resources. The hardware virtualization service provides users with the ability to create and manage virtual machines in provider network 100. In the hardware virtualization service, the underlying physical server is divided into multiple virtual servers, each with its own operating system, applications, and resources. Each virtual machine operates as if it were running on its own dedicated hardware, with access to its own virtual CPUs, memory, and storage.

As another example, CLI service 106 may support an "update-autoscaling-group" command allowing a user to change auto scaling limits. Auto-scaling may be a feature of provider network 100 that enables the automatic scaling of resources based on demand for a user's application built using resources of provider network 100. Provider network 100 automatically increases or decreases the amount of resources in provider network 100 allocated to the user's application based on changes in demand for the application. Auto-scaling in provider network 100 may operate by configuring rules and policies that define when additional resources should be added or removed. Those rules and policies are based on various metrics such as CPU usage, network, traffic, or number of requests, and can be customized by the user to meet the specific needs of the application by using the update-autoscaling-group command.

As yet another example, CLI service 106 may support a "start-automation-execution" command that allows a user to run an automation runbook with a systems manager service (not shown) in provider network 100. An automation runbook (equivalently an "automation playbook, automation script, or automation workflow") is a documented set of procedures and steps used to automate routine tasks, processes, and workflows. The runbook describes the steps needed to complete a specific task, including the inputs and outputs, and the dependencies of the task. Automation runbooks can be used to automate a wide range of tasks, from simple administrative tasks like user management or backups to complex workflows like provisioning infrastructure or deploying applications. Runbooks can be created using different automation tools, such as PowerShell, Bash, Python, or Ansible, and can be executed manually by a user issuing the "start-automation-execution" command.

As still yet another example, CLI service 106 may support an "invoke" command to invoke execution of a short-lived function with an on-demand code execution service (not shown) in provider network 100. The on-demand code execution service allows users to write and run code (e.g., written in Node.js, Python, Java, C#, etc.) without the need for the user to provision, manage, or scale resources in provider network 100 for executing the code. Instead, the on-demand code execution service automatically manages the computing resources in provider network 100 needed to execute the code. When a function is triggered by an invoke command that identifies the function, the on-demand code execution service automatically provisions the necessary computing resources to run the function and then deallocates the resources when the function has completed. This allows organizations to pay only for the computing resources used by the function, rather than paying for the entire server.

The above are just examples of possible CLI command that may be supported by CLI service 106. CLI service 106 may support all these commands, a superset of these commands, or a subset thereof depending on the services availability in provider network 100.

Search engine service 108 is an artificial intelligence (AI)-powered search service in provider network 100. Search engine service 108 uses natural language processing (NLP) and machine learning (ML) algorithms to enable users to search across a range of data sources in provider network 100 such as websites, file systems, data storage containers, and databases. Search engine service 108 understands natural language queries and returns results based on the user's intent. Some features of search engine service 108 may include: understanding of natural language queries and returning relevant results; use of ML algorithms to learn from user behavior and improve search results over time; support of various security features such as encryption, access control, and audit logging to protect data and ensure compliance; and integration with other services in provider network 100 and third-party applications.

Resource explorer service 110 allows a user to search and query the properties of various resources (e.g., virtual machine instances, security groups, access control roles, etc.) in provider network 100 that are associated with the user's account. To do this, resource explorer service 110 supports a domain-specific database query language. Resource explorer service 110 provides a natural language querying interface to users that allow users to search and query for resources using natural language queries. Resource explorer service 110 translates the natural language queries to queries in the domain-specific database query language and executes the domain-specific database query language queries against a database of the user's resources.

Provider network 100 includes chatbot service 126 that encompasses dialog manager 112. Chatbot service 126 uses programmed rules or artificial intelligence (AI) to simulate conversation with a user through text-based user interface at client device 104 such as one provided via messaging application, a website, or a mobile application. Chatbot service 126 is configured to understand natural language text inputs and respond to the inputs in a way that mimics human conversation. While chatbot service 126 may be used for user support regarding provisioning of, management of, and interaction with resources in provider network 100, the techniques herein can be used within other types of chatbot services such as those used for customer support for other businesses, sales and marketing, or for personal productivity. For example, the techniques herein could be implemented with a chatbot service used by a company to answer common customer questions or to help users navigate the company's website or application. As another example, the techniques herein could be implemented with a chatbot service that helps users manage their tasks, schedule appointments, or find information on the internet. In any case, the techniques herein can be used in any chatbot service having a need to route user utterances input by the user via the chatbot UI to one or more backend services for further processing of the user utterances and for obtaining response or answers to the user utterances.

In operation, a user at client device 104 inputs an utterance via chatbot UI 120 into a chatbot application. For example, the utterance may be input via a physical or virtual keyboard or may be spoken by the user. If spoken, a digital audio recording of the utterance can be captured and converted from speech-to-text using speech-to-text conversation technology either at client device 104 or at provider network 100.

In the example of FIG. 1, a user may input an utterance intended for processing by CLI service 106 such as, for example, "create a data storage container" or "create a new on-demand code execution function." Or a user may input an utterance intended for search engine service 108 such as, for example, "how do I ssh into a virtual machine instance?" or "what regions are supported by the provider network?". Or a user may input an utterance intended for resource explorer service 110 such as, for example, "show me all my resources in the WEST region of the provider network" or "what services of the provider network do I use in the EAST region of the provider network?" Or a user may input an utterance that is out-of-scope such as, for example, "make me a coffee," "you are awesome," "lol u awake ?????," or "tell me a joke."

At step 1, the user utterance is sent in digital audio form or text form to chatbot service 126 of provider network 100 from client device 104 via intermediate network 102. If the user utterance is received in digital audio form, provider network 100 may apply speech-to-text techniques to convert the user utterance to a text representation (e.g., a sequence of text characters). In any case, provider network 100 may pre-process the user utterance in text form such as by performing spell checking, tokenization (e.g., breaking the utterance into individual words or tokens), stopword removal (e.g., removing words such as "the", "and", "a", or "is" from the utterance that do not carry significant meaning for the utterance routing analysis), stemming/lemmatization (e.g., reducing words in the utterance to their base form), parts-of-speech tagging (e.g., assigning words in the utterance a part-of-speech such as noun, verb, adjustive, etc.), named entity recognition (e.g., identifying and classifying named entities in the utterance such as people, organizations, and locations), or text normalization (e.g., transforming the utterance to a standard form such as all lowercase letters or removing punctuation).

At step 2, trained utterance encoder 118 encodes the utterance as a fixed-dimensional vector (utterance embedding 122.). Trained utterance encoder 118 may be based on a language model for generating utterance embedding 122. The language model can be a statistical model that is used to predict the probability of a sequence of words in a natural language. The language model can be a type of machine learning model that is trained on a large corpus of text data, such as books, news articles, websites, documentation, social media posts, or other text data sources. The goal of the language model can be to learn the patterns and relationships between words in a language, so that it can generate coherent and grammatically correct sentences that are similar to those found in the training data. The language model can be one of several different types of language models, including an n-gram model, a neural network model, or a transformer model. N-gram models are based on the frequency of occurrence of n-word sequences in the training data, while neural network models use deep learning techniques to learn the relationship between words in a more sophisticated way. Transformer models, such as a Bidirectional Encoder Representations from Transformers (BERT) model and a Generative Pre-trained Transformer (GPT) model, use a self-attention mechanism to allow the model to consider the context of each word in the sequence.

In some embodiments, trained utterance encoder 118 encodes the utterance as utterance embedding 122 using the encoder of a pre-trained transformer model such as pre-trained BERT or GPT model. The transformer encoder is responsible for encoding the input utterance into a set of hidden representations that capture the meaning and context of each word or token in the utterance. The encoder consists of multiple layers of self-attention and feedforward neural networks. In each layer of the encoder, the self-attention mechanism is used to compute a weighted sum of the input embeddings, where the weights are learned based on the similarity between each pair of words or tokens in the utterance. This allows the encoder to capture the context and dependencies between words or tokens in the sequence. The feedforward neural network is then used to transform the output of the self-attention layer into a higher-level representation. This transformation is performed independently for each position in the utterance, allowing the encoder to capture both local and global dependencies between words. The final set of hidden representations in the transformer encoder after the utterance has been entirely processed by the transformer encoder can be used as utterance embedding 122. This final set of hidden representations is sometimes referred to as a classification (CLS) embedding. The CLS embedding or other embedding generated by a pre-trained transformer encoder that represents the entire utterance including its syntax, semantics, and context can be used as utterance embedding 122 that encodes the utterance.

At step 3, utterance embedding 122 representing the utterance is input to trained service classifier 116. As described in greater detail below with respect to FIG. 2, trained service classifier 116 is trained to predict N+1 classes for a given utterance. Here, N is the number of services to which utterances can possibly be routed. An additional class is whether the given utterance is in-scope or out-of-scope. In the example of FIG. 1, N is three. However, N may be fewer than three or more than three in a different implementation according to the requirements of that implementation. Additionally or alternatively, a different implementation may encompass a different set of services depending on various factors such as the goals and purposes of chatbot service 126.

Trained service classifier 116 takes utterance embedding 122 as input, and outputs a set of classification logits 124 based on the pattern trained service classifier 116 learned from the training data during joint training. Set of classification logits 124 includes one logit for each possible target service and an additional in-scope logit. For example, set of classification logits 124 has four logits, one each for CLI service 106, search engine service 108, and resource explorer service 110 and an additional in-scope logit. Each logit in set of classification logits 124 is a numerical value representing the probability that the utterance as represented by utterance embedding 122 belongs to the respective class. For example, each logit in set of classification logits 124 can represent a value between zero (lowest probability of belonging to the respective class) and one (highest probability of belonging to the respective class).

Trained service classifier 116 can be one of various possible types of machine learning classifiers such as any of the following types of machine learning classifiers: logistic regression, decision trees, random forests, support vector machines (SVMs), and neural networks.

At step 4, a decision is made by utterance router 114 if the utterance is in-scope or out-of-scope. Utterance router 114 makes this decision based on classification logits 124. If the decision is out-of-scope, then a response to returned by chatbot service 126 to client device 104 indicating that the utterance is out-of-scope. For example, in the case the utterance is out-of-scope, the response may cause chatbot UI 120 to display text such as "I don't understand your request" or "I'm sorry, I do not understand what you mean by '[utterance]'. Can you please provide me with more information or ask a specific question?"

Figure 3:
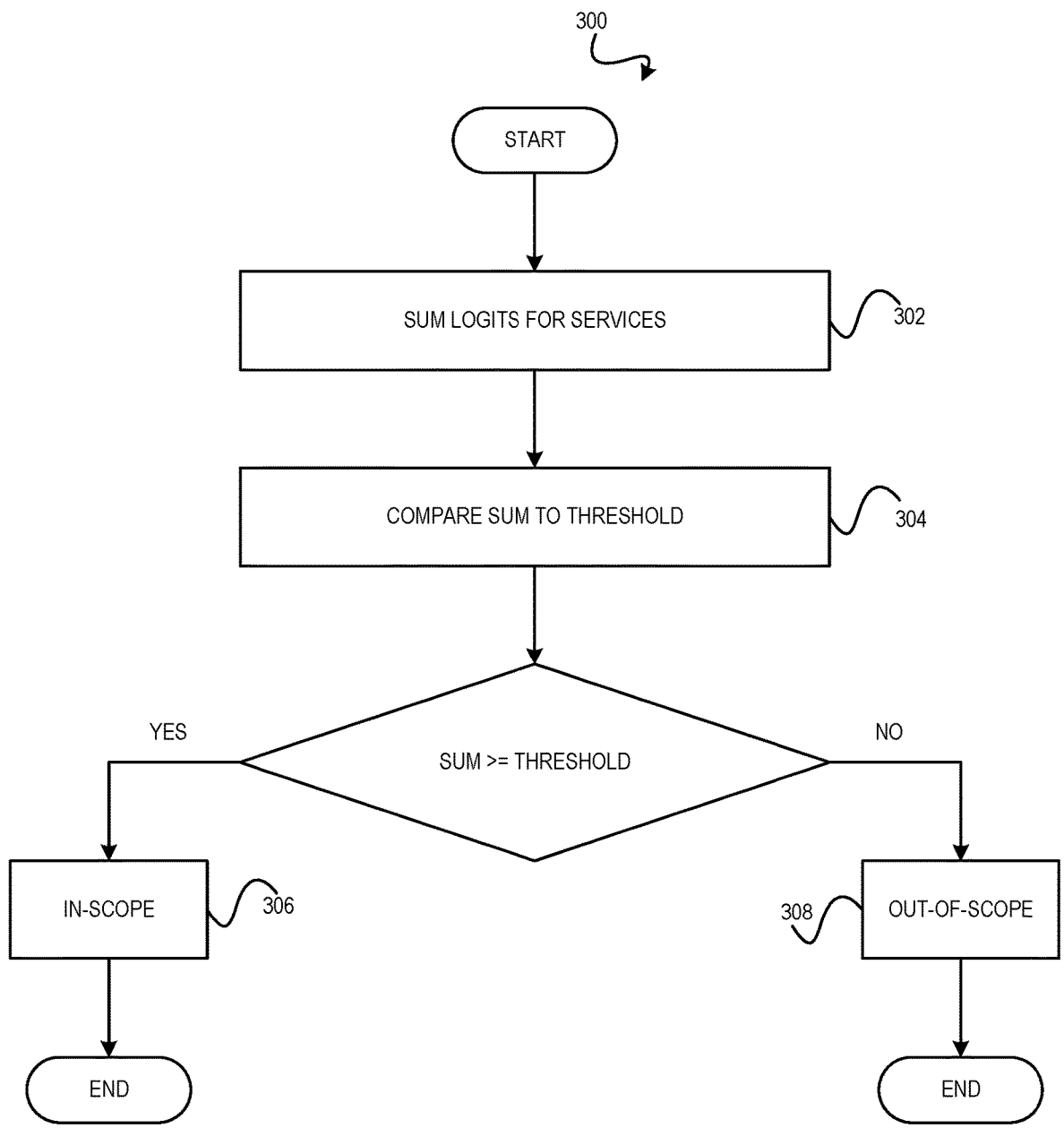
FIG. 3 illustrates an example method for determining whether an utterance is in-scope or out-of-scope according to some examples.

On the other hand, if the decision is in-scope, then utterance router 114 makes a further decision of which service 106, 108, or 110 to route the utterance to for further processing. In some embodiments, as illustrated in FIG. 3, utterance router 114 determines that utterance is in-scope or out-of-scope by summing 302 the logits in classification logits 124 for the services 106, 108, and 110 and comparing 304 the sum to a predetermined threshold. The sum represents a confidence of trained service classifier 116 than the utterance belongs to one of the in-scope classes. If the sum is greater than or equal to the predetermined threshold, then utterance router 114 determines 306 that the utterance is in-scope. Otherwise, if the sum is below the threshold, then the utterance router 114 determines 308 that the utterance is out-of-scope.

Alternatively, utterance router 114 can determine that the utterance is in-scope or out-of-scope by comparing the in-scope logit to a predetermined threshold. For example, utterance router 114 can determine that the utterance is in-scope if the in-scope logit is greater than or equal to the threshold, and determine the utterance is out-of-scope otherwise.

As yet another alternative, utterance router 114 can determine that the utterance is in-scope or out-of-scope by comparing the sum of the service classification logits to a first threshold and the in-scope logit to a second threshold. Utterance router 114 can then determine that the utterance is in-scope if the sum of the service classification logits is greater than or equal to the first threshold and the in-scope logit is greater than or equal to the second threshold, and determine the utterance is out-of-scope otherwise.

Thresholds used by utterance router 114 to determine whether an utterance is in-scope or out-of-scope based on classification logits 124 may be selected according to the requirements of the particular implementation at hand. For example, a threshold can be selected empirically based on the results of the joint training. For example, a threshold can be selected that would corresponding to correct in-scope vs out-of-scope determinations for classification logits produced by trained service classifier 116 for a mixed service set of validation utterances during a validation training phase.

At step 5, if utterance router 114 determines that the utterance is in-scope at step 4, then utterance router 114 routes the utterance to the service 106, 108, or 110 with the most probable (e.g., highest valued) logit of classification logits 124. In this example, trained service classifier 116 has determined that service 108 is the most probable service 108 among services 106, 108, and 110 for processing the utterance. Thus, utterance router 114 can send the utterance to service 108 for further processing.

At step 6, after service 108 has processed the utterance, chatbot service 126 receives a text response from service 108. At step 7, the text response from service 108 is sent to client device 104 where it may be displayed to the user in chatbot UI 120 (e.g., as an answer or response to the utterance).

Figure 2:
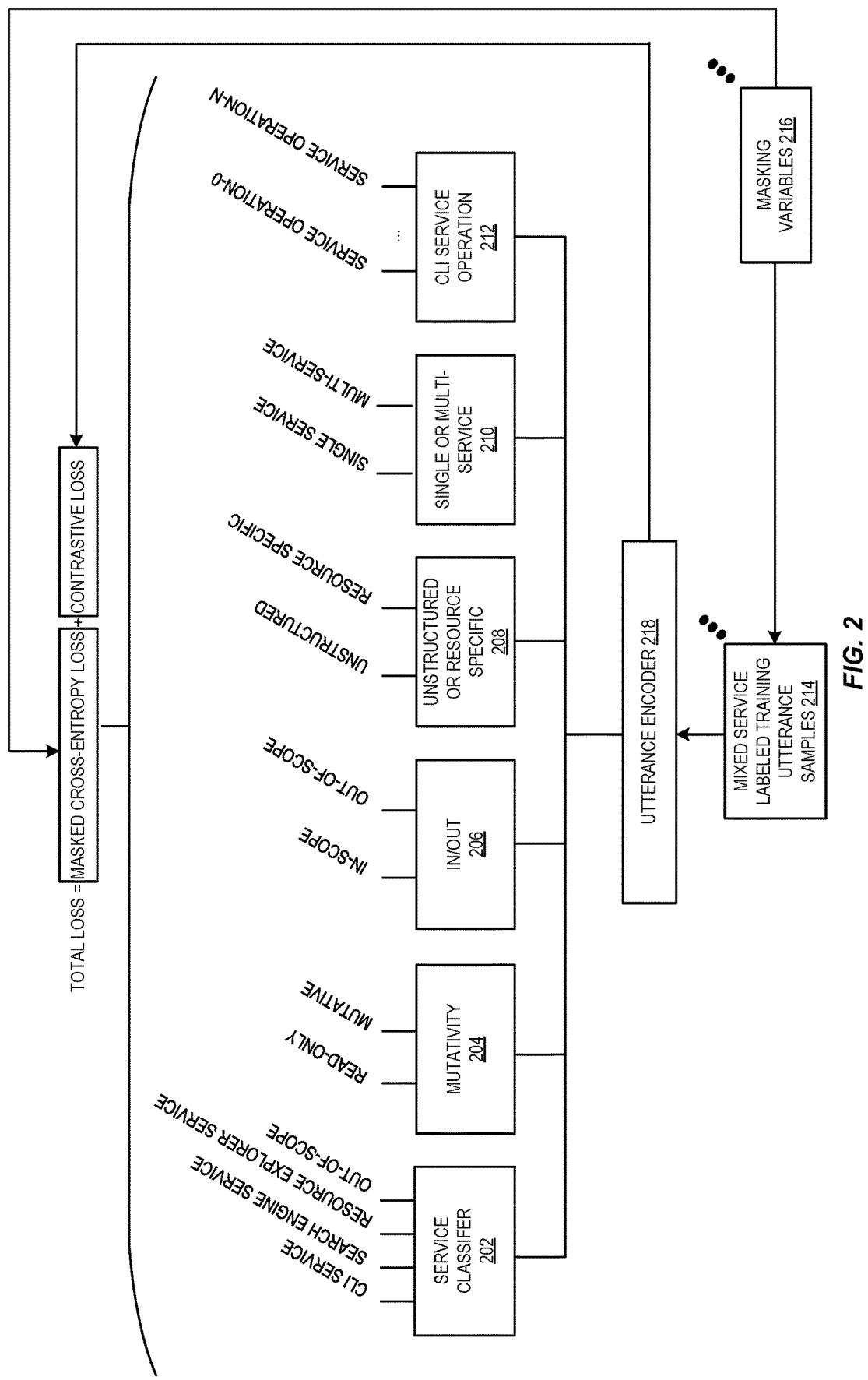
FIG. 2 illustrates an example of jointly training a service classifier and a set of auxiliary classifiers.

Example of Jointly Training a Service Classifier and a Set of Auxiliary Classifiers FIG. 2 illustrates joint training of service classifier 202 with a set of auxiliary classifiers 204, 206, 208, 210, and 212 to yield trained service classifier 116. Service classifier 202 is trained service classifier 116 before service classifier 202 is jointly trained with the set of auxiliary classifiers 204, 206, 208, 210, and 212. In other words, a final set of model parameters of service classifier 202 after joint training is complete can be used as the initial model parameters of trained service classifier 116.

The outputs of auxiliary classifiers 204, 206, 208, 210, and 212 during joint training help service classifier 202 learn better representations of the labeled training utterance samples of training data 214 by incorporating both the outputs of service classifier 202 and the outputs of the auxiliary classifiers 204, 206, 208, 210, and 212 in the masked cross-entropy loss function and optimizing both the cross-entropy loss of the service classifier 202 and the masked cross-entropy losses of the auxiliary classifiers 204, 206, 208, 210, and 212 together. By doing so, the trained service classifier 116 can make better predictions and achieve higher accuracy.

The set of auxiliary classifiers 204, 206, 208, 210, and 212 is specific to the set of services 106, 108, and 110 to which utterances can be routed. The set of auxiliary classifiers used in joint training of service classifier 202 may be different for a different set of possible services to which utterances can be routed or even different for the set of services 106, 108, and 110. Thus, set of auxiliary classifiers 204, 206, 208, 210, and 212 should be viewed an example set of possible auxiliary classifiers provided for the purpose of illustrating a clear example. For example, the set of auxiliary classifiers can be those depicted in FIG. 2, a superset of those auxiliary classifiers, or a subset thereof.

Mutativity classifier 204 is jointly trained to distinguish between training sample utterances that are read-only (describe, list, etc.) vs those that are mutative (start, stop, etc.). In/out classifier 206 is jointly trained to distinguish between utterances that are in-scope or those that are out-of-scope. Unstructured or resource specific classifier 208 is jointly trained to distinguish between utterances that are (1) intended for CLI service 106 or resource explorer service 110, and (2) intended for search engine service 108. Single or multiple service classifier 210 is jointly trained to distinguish between utterances that operate on a single service of provider network 100 or multiple services of provider network 100. CLI service operation classifier 212 is jointly trained to distinguish between N different types of CLI commands. In some embodiments, N is in the thousands (e.g., 8,000+ different types of CLI commands).

Training data 214 comprises mixed service sample utterances. That is, training data 214 comprises a set of sample utterances intended for CLI service 106 (labeled "CLI SERVICE"), another set of sample utterances intended for search engine service 108 (labeled "SEARCH ENGINE SERVICE"), and yet another set of sample utterances intended for resource explorer service 110 (labeled "RESOURCE EXPLORER SERVICE"). Training data 214 also includes a set of "OUT-OF-SCOPE" sample utterances. As a result, not every sample utterance in training data 214 is valid for classification by all auxiliary classifiers 204, 206, 208, 210, and 212. For example, mutativity classifier 204 cannot validly classify OUT-OF-SCOPE sample utterances; unstructured or resource specific classifier 208 also cannot validly classify OUT-OF-SCOPE sample utterances, single or multi-service classifier 210 cannot validly classify SEARCH ENGINE SERVICE or OUT-OF-SCOPE sample utterances, and CLI service operation classifier 212 can only validly classify CLI SERVICE sample utterances.

In addition to being labeled by one of the labels associated with service classifier 202, each sample utterance in training samples can be labeled by one label associated with each of one or more of the auxiliary classifiers 204, 206, 208, 210, and 212 that are valid for the sample utterance. For example, a sample utterance labeled "CLI SERVICE" may also be labeled by one of the labels associated with each of the auxiliary classifiers 204, 206, 208, 210, and 212. As another example, a sample utterance labeled "OUT-OF-SCOPE" may be labeled by only a label associated with in/out classifier 206.

As a result of not all auxiliary classifiers 204, 206, 208, 210, and 212 being valid for all sample utterances in training data 214, a masked cross-entropy loss function is used in the total loss function for joint training, as shown in FIG. 2. In particular, the total loss for a given training sample utterance i of training data 214 is calculated as the sum of a masked cross-entropy loss for the given training sample utterance i and a contrastive loss. The masked cross-entropy loss $L_{ce}^{i}$ for the given training sample utterance i can be represented by:

$$L_{ce}^{i} = L_{main}^{i} + \gamma_{mut}^{i} L_{mut}^{i} + \gamma_{inout}^{i} L_{inout}^{i} + \gamma_{unstruct}^{i} L_{unstruct}^{i} + \gamma_{multi}^{i} L_{multi}^{i} + \gamma_{sevop}^{i} L_{sevop}^{i}$$

In the above equation, the parameter $L_{main}^{i}$ represents the cross-entropy loss of service classifier 202 for the given training sample utterance i. The masked cross-entropy loss $L_{ce}^{i}$ is calculated as a sum of the cross-entropy loss of service classifier 202 for the given training sample utterance i ($L_{main}^i$) and masked cross-entropy losses of each the auxiliary classifiers 204, 206, 208, 210, and 212 for the given training sample utterance i where each such loss may be masked by a masking variable depending on whether the respective auxiliary classifier produces a valid classification for the given training sample utterance i.

In some embodiments, the masking variable is 1 if the respective auxiliary classifier produces a valid classification for the given training sample utterance i, or 0 if the respective auxiliary classifier does not produce a valid classification for the given training sample utterance i.

Whether an auxiliary classifier produces a valid classification for a given training sample utterance i can be determined based on the service classifier label assigned to the given training sample utterance i. FIG. 4 illustrates masking variables 216 for by the different possible service classifier 202 labels. For example, if a training sample utterance is labeled as "SEARCH ENGINE SERVICE," then the masking variables in the masked cross-entropy loss calculation for the sample utterance is zero (0) for each of the cross-entropy losses of the single or multi-classifier 210 and CLI service operation classifier 212 for the sample utterance, but one (1) for the cross-entropy losses of the mutativity, in/out, and unstructured or resource specific classifiers 204, 206, and 208 for the sample utterance.

While in some embodiments the values of masking variables 216 are either zero or one, a value can be between zero and one inclusive in other embodiments. For example, the values of making variables 216 can be numerical weights between zero and one inclusive that vary among different auxiliary classifiers or different service classifier 202 labels. For example, the weights can be selected empirically or learned using a machine learning technique.

In some embodiments, utterance encoder 218 is jointly trained along with service classifier 202 and auxiliary classifiers 204, 206, 208, 210, and 212 to yield trained utterance encoder 118. That is, a final set of model parameters of utterance encoder 218 resulting from joint training can be used as the model parameters for trained utterance encoder 118. During joint training, utterance encoder 218 generates utterance embeddings for training sample utterances of training data 214 that are input to each of the classifiers 202, 204, 206, 208, 210, and 212. Pairs of utterance embeddings for pairs of training sample utterances generated by utterance encoder 218 are used to compute a contrastive loss during joint training.

The contrastive loss aims at increasing the discrepancy of the utterance embeddings of sample utterances classified in different classes by classifiers 202, 204, 206, 208, 210, and 212. During joint training, sample utterances classified in the same classes are regarded as pseudo-ID data while sample utterances classified in different classes are considered mutually pseudo-OOD data. Increasing inter-class discrepancies helps service classifier 202 learn discriminative features for ID/OOD distinctions, and therefore helps trained service classifier 116 detect true OOD data at inference.

To achieve this goal, the contrastive loss function calculates distances between pairs of utterance embeddings generated by utterance encoder 218 for pairs of training sample utterances of training data 214 and compares the distances between pairs to a margin value. If a pair of training sample utterances are similar (e.g., classified by classifiers 202, 204, 206, 208, 210, and 212 in the same classes), their utterance embeddings should be close together, and the distance between them should be small. If the pair of training sample utterances are dissimilar (e.g., classified by classifiers 202, 204, 206, 208, 210, and 212 in different classes), their utterance embeddings should be far apart, and the distance between them should be large. The contrastive loss function penalizes the contrastive loss function and hence the total loss function if the distance between a pair of similar training sample utterances is larger than the margin value or if the distance between a pair of dissimilar training sample utterances is smaller than the margin value. The contrastive loss function can be represented as:

$$\text{Contrastive Loss} = (1-y)*d^2 + y*\max(0, \text{margin} - d)^2$$

Here, the parameter y represents a binary label that indicates whether a pair of training sample utterances in samples of training data 214 are similar (y=1) or dissimilar (y=0). The parameter d represents the distance between utterance embeddings generated by utterance encoder 218 during joint training for the pair of training sample utterances (e.g., the cosine or Euclidean distance between the utterance embeddings). The parameter margin represents a hyperparameter that determines the minimum allowed distance between a pair of dissimilar training sample utterances.

In some embodiments, a pair of training sample utterances in samples of training data 214 is labeled as similar (y=1) if they have the same set of classification labels for classifiers 202, 204, 206, 208, 210, and 212. Otherwise, the pair of training sample utterances is labeled as dissimilar (y=0).

In some embodiments, a pair of training sample utterances in samples of training data 214 is labeled as similar (y=1) if they have the same classification labels for service classifier 202 even if they have different classification labels for one or more or all auxiliary classifiers 204, 206, 208, 210, and 212. Otherwise, the pair of training sample utterances is labeled as dissimilar (y=0).

During joint training, the total loss including the masked cross-entropy loss and the contrastive loss is minimized. By minimizing the masked cross-entropy loss during training, service classifier 202 learns better (more compact) representations of the labeled training utterance samples of training data 214 by incorporating both the outputs of service classifier 202 and the outputs of the auxiliary classifiers 204, 206, 208, 210, and 212 in the masked cross entropy loss function and optimizing both the cross-entropy loss of the service classifier 202 and the masked cross-entropy losses of the auxiliary classifiers 204, 206, 208, 210, and 212 together. By doing so, the trained service classifier 116 can make better predictions and achieve higher accuracy.

The contrastive loss function is also minimized during joint training. By doing so, utterance encoder 218 learns to map similar utterances to nearby utterance embeddings and dissimilar utterances to distant utterance embeddings.

In the joint training of FIG. 2, an utterance embedding generated by utterance encoder 218 for each sample in samples of training data 214 may be input to each auxiliary classifier 204, 206, 208, 210, and 212 even though one or more of the auxiliary classifiers may not be able to validly classify the utterance. Instead, the masked cross-entropy loss is used to selectively mask invalid cross-entropy losses output by the auxiliary classifiers as described herein. This may be done to improve the computational performance of the joint training. In particular, training of the auxiliary classifiers can be performed using efficient matrix operations on graphical processing unit processors (GPUs) or the like. Whereas conditional programming logic such as if/then/else logic that might be used to test whether a given utterance embedding should be input to a given auxiliary classifier is typically executed using less efficient general-purpose processors (CPUs) or the like. For this reason, using the masked cross-entropy loss and inputting each utterance embedding into each auxiliary classifier can be more computationally efficiently than conditional logic that determines which utterance embeddings should be input to which auxiliary classifiers.

Example Method for Chatbot Utterance Routing in a Provider Network

Figure 5:
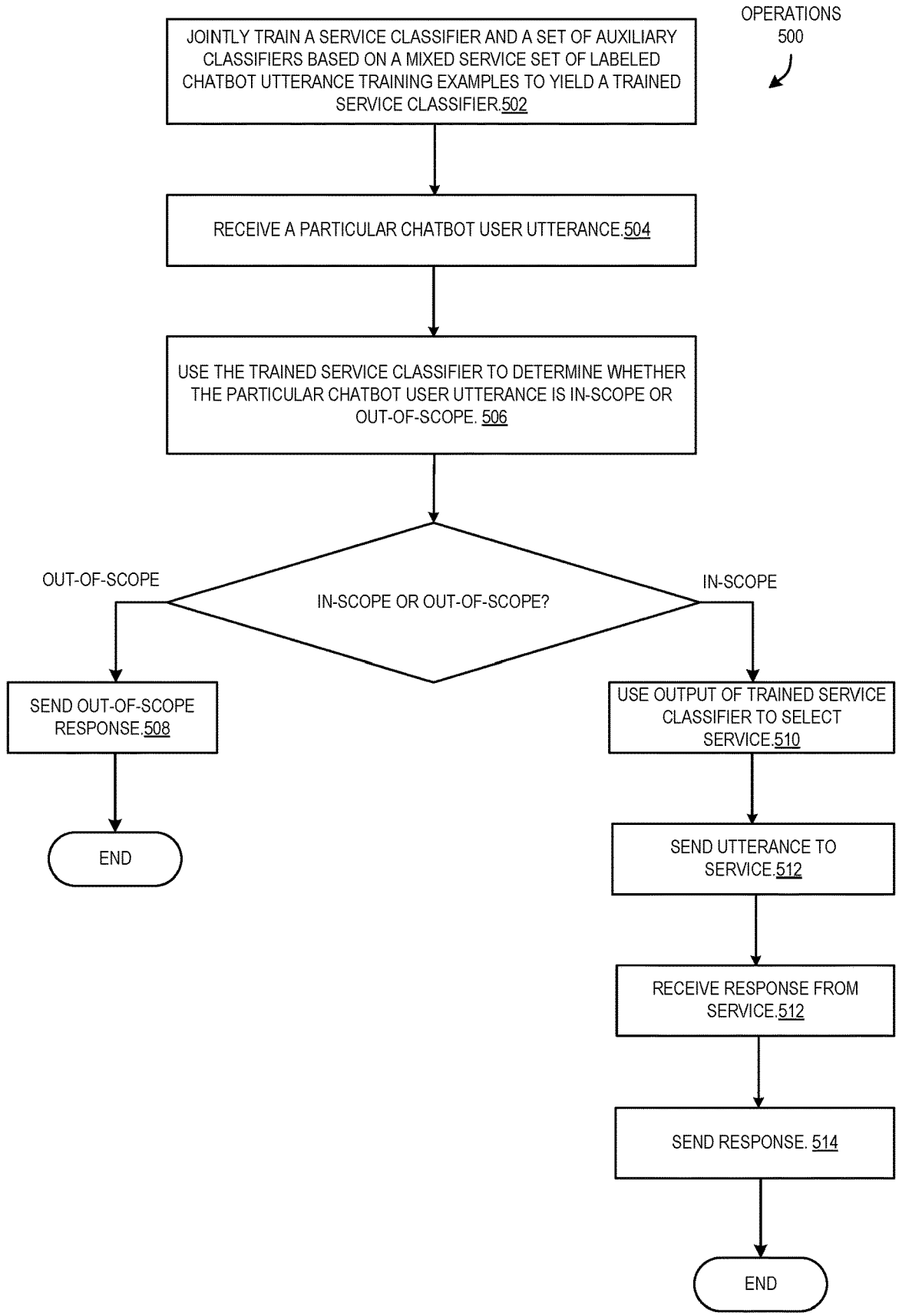
FIG. 5 is a flow diagram illustrating operations of an example method for chatbot utterance routing in a provider network according to some examples.

FIG. 5 is a flow diagram illustrating operations 500 of a method for chatbot utterance routing in a provider network. Some or all the operations 500 are performed under the control of one or more electronic devices, and are implemented as code (e.g., executable instructions, one or more computer programs, or one or more applications) executing collectively on one or more processors. The code is stored on a non-transitory computer-readable medium executable by one or more processors. Some or all the operations 500 can be performed by dialog manager 112 of the other figures.

The operations 500 include, at block 502, dialog manager 112 jointly training service classifier 202, set of auxiliary classifiers 204, 206, 208, 210, and 212, and utterance encoder 218 based on mixed service set of labeled chatbot utterance training samples of training data 214 to yield trained service classifier 116. The joint training can proceed as described in greater detail herein with respect to FIG. 2.

The operations 500 further include, at block 504, dialog manager 112 receiving a particular chatbot user utterance. For example, the particular chatbot user utterance can be received from client device 104 in response to a user of client device 104 inputting the particular chatbot user utterance into chatbot UI 120.

The operations 500 further include, at block 506, dialog manager 112 using trained service classifier 116 to determine whether the particular chatbot user utterance is in-scope or out-of-scope. Dialog manager 112 can make this in-scope vs out-of-scope determination as described in greater detail herein with respect to FIG. 3. If out-of-scope, then the operations 500 further include, at block 508, dialog manager 112 sending a response indicating the particular chatbot user utterance is out-of-scope. For example, the response can be sent to client device 104 for presentation in chatbot UI 120.

If in-scope, then the operations 500 further include, at block 510, dialog manager 112 using the output of trained service classifier 116 to select a service to which to route the particular chatbot user utterance. For example, the service indicated by the output of the trained service classifier 116 as the most probable service to which the particular chatbot user utterance belongs can be selected as the service to which to route the utterance. The operations 500 further include, at block 512, dialog manager 112 sending the utterance to the selected service for further processing and, at block 514, dialog manager 112 receiving a response from the selected service reflecting the results of processing the utterance by the selected service. The operations 500 further include, at block 514, dialog manager 112 sending the response received from the selected service. For example, the response can be sent to client device 104 for presented in chatbot UI 120.

Example Provider Network

Figure 6:
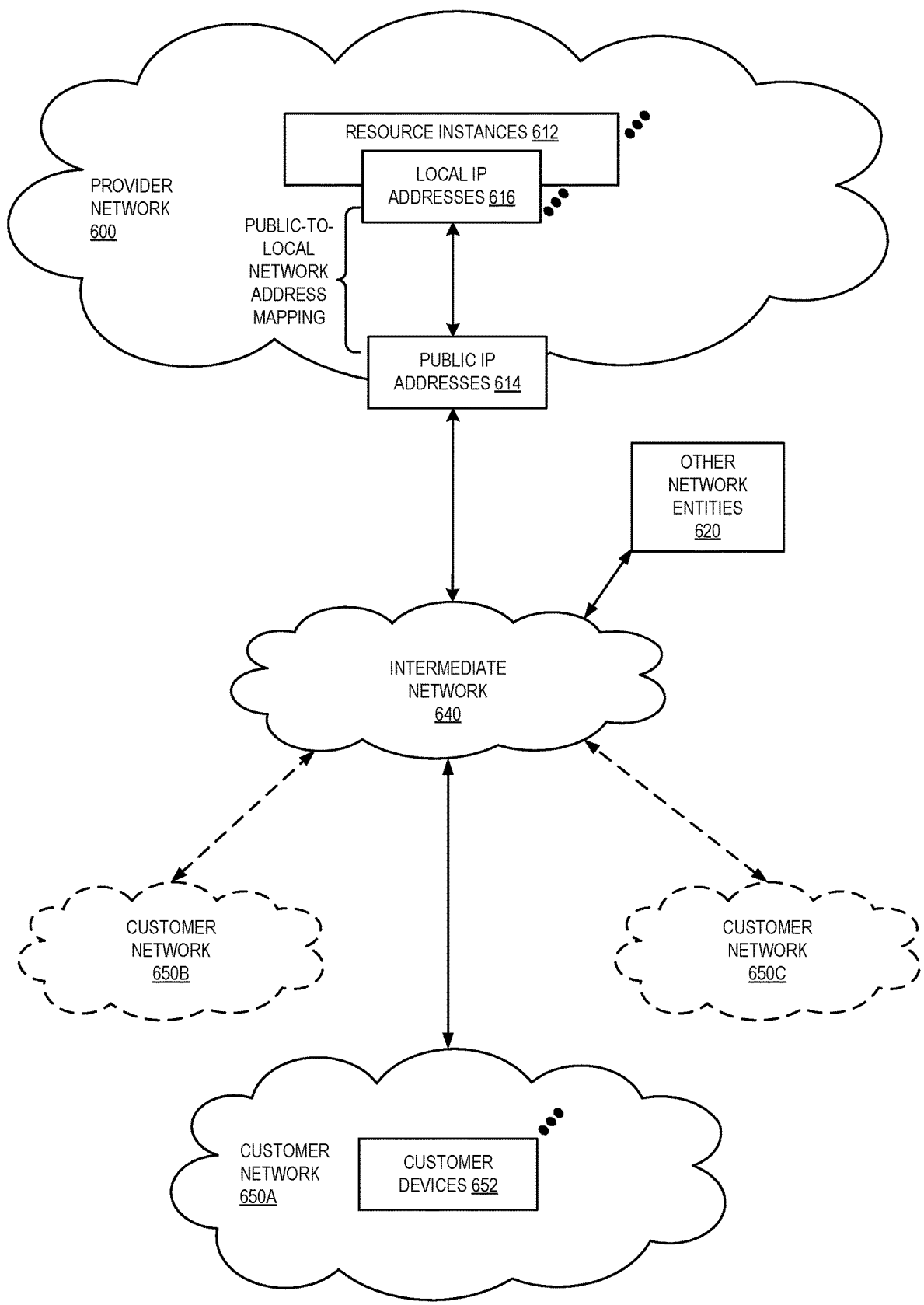
FIG. 6 illustrates an example provider network environment according to some examples.

FIG. 6 illustrates provider network 600. Provider network 600 provides resources to customers via services that allow customers to purchase, rent, or otherwise obtain instances 612 of resources, including but not limited to computing, networking, and data storage resources, implemented on electronic devices within provider network 600 in one or more data centers.

Local Internet Protocol (IP) addresses 616 are associated with resource instances 612. Local IP addresses 616 are the internal network addresses of resource instances 612 in provider network 600. Provider network 600 also uses public IP addresses 614. Provider network 600 allows customers (e.g., customers that operates customer networks 650A-650C (or "client networks") including customer devices 652) to dynamically associate public IP addresses 614 provisioned to the customers with resource instances 612 provisioned to the customers. Provider network 600 also allows the customers to remap public IP address 614 provisioned to the customers between resource instances 612 provisioned to the customers.

Using resource instances 612 and public IP addresses 614, customers can implement customer-specific applications and offer them on intermediate network 640, such as the Internet. Other network entities 620 on intermediate network 640 can then generate request traffic to public IP address 614. The request traffic is routed from other network entities 620 through intermediate network 640 to provider network 600. The request traffic received at provider network 600 is routed to local IP addresses 616 of resource instances 612 which process (handle) the request traffic. Response traffic generated by resource instances 612 is routed onto intermediate network 640 back to other network entities 620.

Local IP addresses 616 are internal or private network addresses of resource instances 612. For example, local IP addresses 616 can be within address blocks reserved by Internet Engineering Task Force (IETF) Request for Comments (RFC) 1918 or of an address format specified by IETF RFC 4193 and can be mutable within provider network 610. Network traffic originating outside provider network 610 is not directly routed to local IP addresses 616. Instead, the traffic uses public IP addresses 614 that are mapped to local IP addresses 616. Provider network 600 can include networking devices or appliances that provide network address translation (NAT) or similar functionality to perform the mapping between public IP addresses 614 and local IP addresses 616.

Provider network 600 can provide its capabilities to customers according to one or more of a variety of different service models including Software-as-a-Service (SaaS), Platform-as-a-Service (PaaS), Infrastructure-as-a-Service (IaaS), or any other provider network service model.

With SaaS, a capability is provided to customers using software applications of provider network 600 and running on the infrastructure of the provider network 600. The applications may be accessible from various remote electronic devices through either a thin client interface such as a command line interface (CLI), a graphical user interface (GUI) (e.g., via a web browser or a mobile or web application), a Software Development Kit (SDK), or any other interface. The infrastructure of provider network 600 includes the hardware resources such as server, storage, and network resources and software deployed on the hardware infrastructure that support the services being provided. Typically, under the SaaS model, customers do not manage or control the underlying infrastructure including network, servers, operating systems, storage, or individual application capabilities, except for limited customer-specific application configuration settings.

With PaaS, customers are provided the capability to deploy, onto hardware and software infrastructure of provider network 600, customer-created or acquired applications using programming languages, libraries, services, and tools supported by provider network 600 or other sources. Typically, under the PaaS model, customers do not manage or control the underlying hardware and software infrastructure including network, servers, operating systems, or storage, but can have control over the deployed applications and possibly configuration settings for the application-hosting environment.

With IaaS, customers are provided the capability to provision processing, storage, networks, and other fundamental computing resources where the customers can deploy and run arbitrary software, which can include operating systems and applications. The customers typically do not manage or control the underlying hardware and software infrastructure but can have control over operating systems, storage, and deployed applications and possibly limited control of selecting network components such as, for example, host firewalls.

Provider network 600 can provide its capabilities to customers according to one or more of a variety of different deployment models including as a private cloud, as a community cloud, as a public cloud, as a hybrid cloud, or any other provider network deployment model.

In a private cloud, the hardware and software infrastructure of provider network 600 is provisioned for exclusive use by a single organization which can comprise multiple customers. The private cloud is owned, managed, and operated by the organization, a third party, or some combination of them, and it can exist on or off premises.

In a community cloud, the hardware and software infrastructure of provider network 600 is provisioned for exclusive use by a specific community of customers from organizations that have shared concerns such as mission security requirements, policy, and compliance considerations. The community cloud is owned, managed, and operated by one or more of the organizations in the community, a third party, or some combination of them, and it can exist on or off premises.

In a public cloud, the infrastructure is provisioned for open use by the public. The public cloud is owned, managed, and operated by a business, academic, or government organization, or some combination of them. A public cloud can exist on the premises of the public cloud provider.

In a hybrid cloud, the infrastructure is a composition of two or more distinct cloud infrastructures (private, community, public, or any other cloud infrastructure) that remain unique entities, but that are bound together by standardized or proprietary technology that enables data and application portability such as, for example, cloud bursting for load balancing between clouds.

Example Computer System

Figure 7:
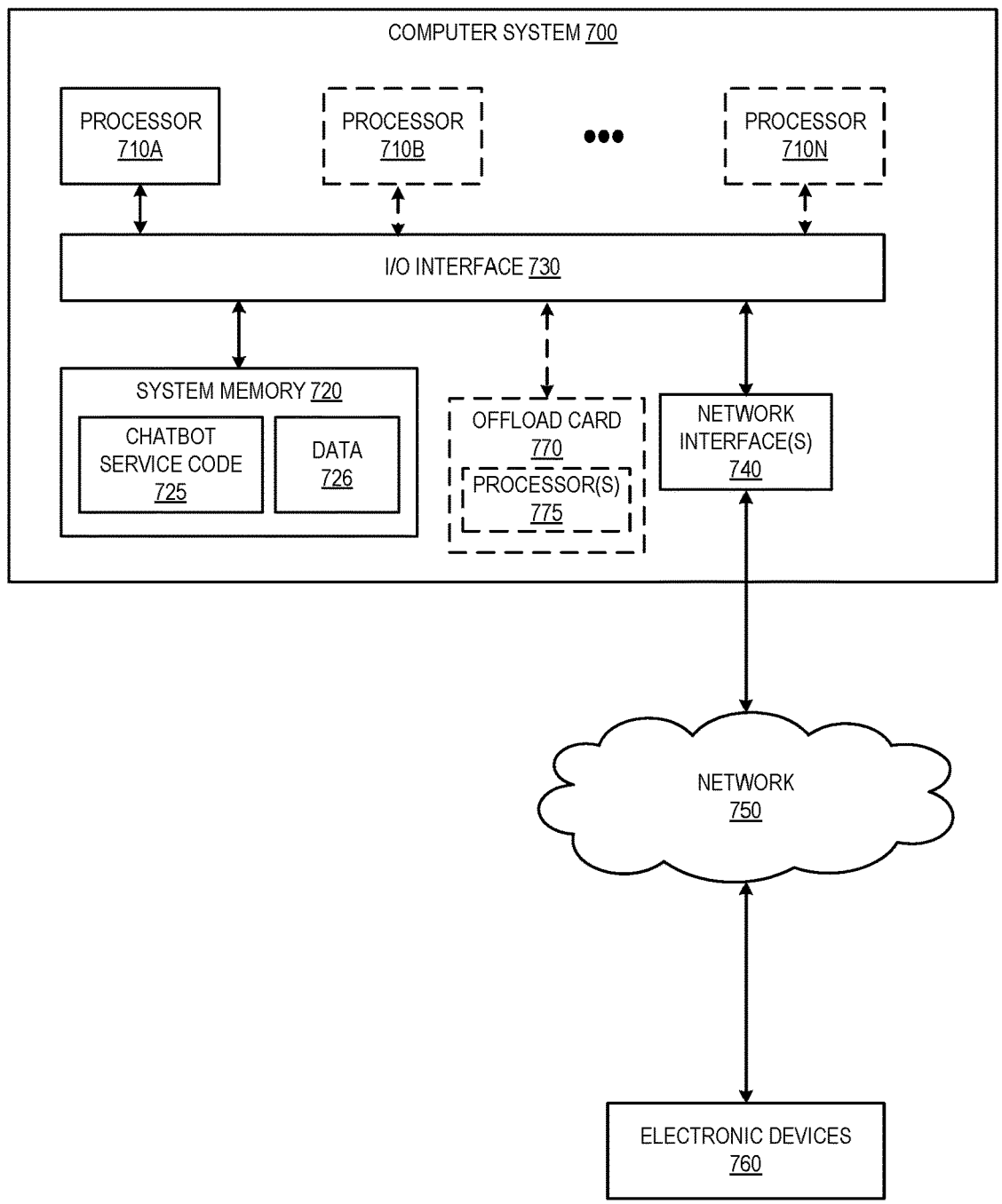
FIG. 7 is a block diagram illustrating an example computer system that can be used in some examples.

A system that implements a portion or all the techniques described herein can include a general-purpose computer system (also referred to herein as an electronic computing device). FIG. 7 illustrates computer system 700. Computer system 700 includes one or more processors 710A-N coupled to system memory 720 via input/output (I/O) interface 730. Computer system 700 further includes network interface 740 coupled to I/O interface 730. While computer system 700 can be a single electronic computing device, computer system 700 can encompass one electronic computing device, or any number of electronic computing devices configured to work together as a single computer system.

Computer system 700 can be a uniprocessor system including one processor 710, or a multiprocessor system including several processors 710A-N (e.g., two, four, eight, or another suitable number). Each processor 710A-N can be any suitable hardware processor capable of executing instructions and its functionality implemented at least in part by integrated circuitry composed of semiconductor material (e.g., silicon), but its functionality can additionally be implemented by software (e.g., firmware). For example, each processor 710A-N can be general-purpose or embedded microprocessor implementing an instruction set architecture (ISAs) such as x86, ARM, PowerPC, SPARC, or MIPS.

System memory 720 stores instructions and data accessible by processor(s) 710. Program instructions and data implementing one or more desired functions, such as those methods, techniques, and data described above, are shown stored within the system memory 720 as chatbot service code 725 (e.g., executable to implement, in whole or in part, the chatbot service 126) and data 726.

System memory 720 is a non-transitory computer-readable medium such as, for example, a volatile or a non-volatile computer-readable medium. Non-limiting examples of electronic devices that encompass volatile computer-readable media include random-access memory (RAM) devices and cache memory devices. For example, system memory 720 may be implemented at least in part by dynamic random-access memory (DRAM) devices or static random-access memory (SRAM) devices. Non-limiting examples of electronic devices that encompass non-volatile computer-readable media include read-only memory (ROM) devices, hard disk drives, solid-state drives, flash drives, magnetic tape drives, optical disk drives, and other types of memory cards. For example, system memory 720 may be implemented at least in part by any or all of: flash memory devices, magnetic disk storage devices, optical disk storage devices, phase-change memory (PCM) devices, ferroelectric RAM (FRAM) devices, magnetoresistive RAM (MRAM) devices, resistive RAM (RRAM) devices, mask ROM devices, programmable ROM (PROM) devices, erasable programming ROM (EPROM) devices, or electrically erasable programmable ROM (EEPROM) devices. Non-transitory computer-readable media is distinct from, but may be used in conjunction with, transitory electronic signals, electromagnetic carrier waves, and other transitory signals.

I/O interface 730 is configured to coordinate I/O traffic between processor(s) 710, system memory 720, and any peripheral devices, including network interface 740. I/O interface 730 performs protocol, timing, or other data transformations to convert data signals from one component (e.g., system memory 720) into a format suitable for use by another component (e.g., processor(s) 710). I/O interface 730 can include support for devices attached through various types of peripheral buses such as, for example, a Peripheral Component Interconnect (PCI) bus, a QuickPath interconnect (QPI) bus, a UltraPath interconnect (UPI) bus, a Universal Serial Bus (USB), or other suitable bus. A function of I/O interface 730 can be split into two or more separate components such as, for example, a north bridge and a south bridge. Some or all the functionality of I/O interface 730 such as, for example, an interface to system memory 720, can be incorporated directly into processor(s) 710.

Network interface 740 allows data to be exchanged between computer system 700 and electronic devices 760 attached to network 750. Network interface 740 supports communication via any suitable wired or wireless data networks such as, for example, a wired or wireless Ethernet networks. Additionally or alternatively, network interface 740 supports communication via telecommunications or telephony networks, such as analog voice networks or digital fiber communications networks, via storage area networks (SANs), such as Fibre Channel SANs, or via any other suitable type of network or protocol.

Computer system 700 optionally includes offload card 770. Offload card 770 includes one or more processors 775 and possibly includes network interfaces 740. Offload card 770 is connected to I/O interface 730. For example, computer system 700 can act as a host for compute instances such as, for example, virtual machine instances or container instances. In this case, processor(s) 775 of offload card 770 can execute a virtualization manager that manages compute instances that execute on processor(s) 710. The virtualization manager can perform compute instance management operations such as, for example, pausing or un-pausing compute instances, launching or terminating compute instances, performing memory transfer/copying operations, etc. These management operations can be performed in coordination with a hypervisor that is executed by processor(s) 710. Additionally or alternatively, the virtualization manager can perform management operations in coordination with other entities executed by processor(s) 710 such as, for example, the compute instances themselves.

Terminology

Ordinal terms such as first, second, etc. may be used in the foregoing description and in the appended claims to describe various elements, features, acts, or operations. Unless the context clearly indicates otherwise, such elements, features, acts, or operations are not limited by those terms. The terms are used only to distinguish one element, feature, act, or operation from another. For example, a first device could be termed a second device. The first device and the second device are both devices, but they are not the same device.

Unless the context clearly indicates otherwise, as used in the foregoing description and in the appended claims, the singular forms "a," "an," and "the" are intended to include the plural forms as well.

Unless the context clearly indicates otherwise, as used in the foregoing description and in the appended claims, the terms "comprising," "including," "having," "based on," "encompassing," and other like terms, are used in the foregoing description and in the appended claims in an open-ended fashion, and do not exclude additional elements, features, acts, or operations.

Unless the context clearly indicates otherwise, the term "based on" (or similar) as used in this description or in the appended claims is an open-ended term used to describe one or more factors that affect or cause a determination or action and does not foreclose additional factors that may affect or cause a determination or action. For example, a determination or action may be affected or caused based solely on the factor(s) listed or based on the factor(s) listed and one or more additional factors.

Unless the context clearly indicates otherwise, the term "or" is used in the foregoing description and in the appended claims in its inclusive sense (and not in its exclusive sense) so that when used, for example, to connect a list of elements, features, acts, or operations, the term "or" means one, some, or all the elements, features, acts, or operations in the list.

Unless the context clearly indicates otherwise, conjunctive language in the foregoing description and in the appending claims such as the phrase "at least one of X, Y, and Z," is to be understood to convey that an item, term, etc. can be either X, Y, or Z, or a combination thereof. Thus, such conjunctive language does not require that at least one of X, at least one of Y, and at least one of Z to each be present.

What is claimed is:

1. A computer-implemented method comprising:
    jointly training a service classifier, a set of auxiliary classifiers, and an utterance encoder based on a mixed service set of labeled chatbot utterance training examples to yield a trained service classifier; wherein the service classifier, the set of auxiliary classifiers, and the utterance encoder are jointly trained according to a masked cross-entropy loss and a contrastive loss;
    receiving a particular chatbot user utterance;
    using the trained service classifier to determine that the particular chatbot user utterance is in-scope and is intended for a particular service of a plurality of services in a provider network;
    sending the particular chatbot user utterance to the particular service;
    receiving a response to the particular chatbot user utterance generated by the particular service; and
    sending the response.

2. The computer-implemented method of claim 1, further comprising:
    obtaining an output of the trained service classifier for the particular chatbot user utterance, the output representing a classification of the particular chatbot user utterance by the trained service classifier;
    wherein the output comprises a plurality of logits, one logit for each service of the plurality of services;
    wherein each logit of the plurality of logits represents a probability that the particular chatbot user utterance is intended for a respective service of the plurality of services; and
    wherein determining that the particular chatbot user utterance is in-scope is based on the plurality of logits;
    wherein sending the particular chatbot user utterance to the particular service is based on determining that the particular chatbot user utterance is in-scope.

3. The method of claim 1, wherein the contrastive loss function is configured to penalize if a distance between a pair of similar training sample utterances is larger than a margin value or if a distance between a pair of dissimilar training sample utterances is smaller than a margin value.

4. The method of claim 1, wherein the masked cross-entropy loss function is configured to selectively mask cross-entropy losses output by the plurality of auxiliary classifiers for the mixed service set of labeled chatbot utterance training examples based on which of the plurality of auxiliary classifiers can validly classify which of the mixed service set of labeled chatbot utterance training examples.

5. The method of claim 1, wherein the plurality of services comprise a command line service, a search engine service, and a resource explorer service.

6. The method of claim 1, wherein a particular auxiliary classifier of the plurality of auxiliary classifiers is configured to classify utterances as either read-only or mutative.

7. A computer-implemented method comprising:
    receiving a particular chatbot user utterance;
    using a trained service classifier to classify the particular chatbot user utterance as intended for a particular service of a plurality of services in a provider network; wherein a service classifier, a plurality of auxiliary classifiers, and an utterance encoder are jointly trained based on a mixed service set of labeled chatbot utterance training examples to yield the trained service classifier; and wherein the service classifier, the set of auxiliary classifiers, and the utterance encoder are jointly trained according to a masked cross-entropy loss and a contrastive loss;

sending the particular chatbot user utterance to the particular service;

receiving a response to the particular chatbot user utterance generated by the particular service; and sending the response.

8. The computer-implemented method of claim 7, further comprising:

obtaining an output of the trained service classifier for the particular chatbot user utterance, the output representing a classification of the particular chatbot user utterance by the trained service classifier;

wherein the output comprises a plurality of logits, one logit for each service of the plurality of services;

wherein each logit of the plurality of logits represents a probability that the particular chatbot user utterance is intended for a respective service of the plurality of services; and determining that the particular chatbot user utterance is in-scope based on the plurality of logits;

wherein sending the particular chatbot user utterance to the particular service is based on determining that the particular chatbot user utterance is in-scope.

9. The computer-implemented method of claim 7, wherein the masked cross-entropy loss function is configured to selectively mask cross-entropy losses output by the plurality of auxiliary classifiers for the mixed service set of labeled chatbot utterance training examples based on which of the plurality of auxiliary classifiers can classify which of the mixed service set of labeled chatbot utterance training examples.

10. The computer-implemented method of claim 7, wherein the contrastive loss function is configured to penalize if a distance between a pair of similar training sample utterances is larger than a margin value or if a distance between a pair of dissimilar training sample utterances is smaller than a margin value.

11. The computer-implemented method of claim 7, wherein the plurality of services comprise a command line service, a search engine service, and a resource explorer service.

12. The computer-implemented method of claim 7, wherein a particular auxiliary classifier of the plurality of auxiliary classifiers is configured to classify utterances as either read-only or mutative.

13. The computer-implemented method of claim 7, wherein a particular auxiliary classifier of the plurality of auxiliary classifiers is configured to classify utterances as either in-scope or out-of-scope.

14. The computer-implemented method of claim 7, wherein a particular auxiliary classifier of the plurality of auxiliary classifiers is configured to classify utterances as either unstructured or resource-specific.

15. The computer-implemented method of claim 7, wherein a particular auxiliary classifier of the plurality of auxiliary classifiers is configured to classify utterances as either single service or multiple service.

16. The computer-implemented method of claim 7, wherein a particular auxiliary classifier of the plurality of auxiliary classifiers is configured to classify utterances as one of a plurality of command line operation types.

17. A system comprising:

a first one or more electronic devices to implement a command line service in a provider network;

a second one or more electronic devices to implement a search engine service in the provider network;

a third one or more electronic devices to implementation a resource explorer service in the provider network; and a fourth one or more electronic devices to implement a chatbot service in the provider network, the chatbot service including instructions that upon execution cause the chatbot service to:

receive a particular chatbot user utterance;

use a trained service classifier to classify the particular chatbot user utterance as intended for a particular one of the command line service, the search engine service, or the resource explorer service; wherein a service classifier, a plurality of auxiliary classifiers, and an utterance encoder are jointly trained based on a mixed service set of labeled chatbot utterance training examples; and wherein the service classifier, the plurality of auxiliary classifiers, and the utterance encoder are jointly trained according to a masked cross-entropy loss and a contrastive loss;

send the particular chatbot user utterance to the particular one of the command line service, the search engine service, or the resource explorer service;

receive a response to the particular chatbot user utterance generated by the particular one of the command line service, the search engine service, or the resource explorer service; and send the response.

18. The system of claim 17, wherein:

the chatbot service further includes instructions that upon execution cause the chatbot service to obtain an output of the trained service classifier for the particular chatbot user utterance, the output representing a classification of the particular chatbot user utterance by the trained service classifier;

the output comprises a plurality of logits, one logit for each service of the command line service, the search engine service, and the resource explorer service;

each logit of the plurality of logits represents a probability that the particular chatbot user utterance is intended for a respective service of the command line service, the search engine service, and the resource explorer service; and the chatbot service further includes instructions that upon execution cause the chatbot service to determine that the particular chatbot user utterance is in-scope based on the plurality of logits.

19. The system of claim 17, wherein the masked cross-entropy loss function is configured to selectively mask cross-entropy losses output by the plurality of auxiliary classifiers for the mixed service set of labeled chatbot utterance training examples based on which of the plurality of auxiliary classifiers can validly classify which of the mixed service set of labeled chatbot utterance training examples.

20. The system of claim 17, wherein the contrastive loss function is configured to penalize if a distance between a pair of similar training sample utterances is larger than a margin value or if a distance between a pair of dissimilar training sample utterances is smaller than a margin value.

* * * * *